Oct. 14, 1930.   P. OKEY   1,778,037
COMPUTING DEVICE
Filed Aug. 23, 1928    2 Sheets-Sheet 1

INVENTOR.
Perry Okey.
BY
ATTORNEY.

Oct. 14, 1930.                P. OKEY                1,778,037
                          COMPUTING DEVICE
                        Filed Aug. 23, 1928         2 Sheets-Sheet 2

INVENTOR.
Perry Okey.
BY
Edwin P. Corbett
ATTORNEY

Patented Oct. 14, 1930

1,778,037

UNITED STATES PATENT OFFICE

PERRY OKEY, OF COLUMBUS, OHIO

COMPUTING DEVICE

Application filed August 23, 1928. Serial No. 301,529.

My invention relates to a computing device. It pertains, more particularly, to a device for performing mathematical calculations by either multiplication or division, although it is not necessarily limited thereto.

Heretofore, computing devices have been more or less complicated, usually involving the use of proportion calculations in the achievement of the desired result. In some instances, computations have been made by the use of a pivoted triangle so mounted that two points of the triangle were adopted to indicate the numbers to be computed and the third point was adapted to indicate the result. In such construction, the resultant numbers were ordinarily distributed over an arcuate surface.

My invention contemplates the provision of a simple mechanical device that is adapted to indicate or record the product when one number is multiplied by another or to indicate the quotient when one number is divided by another. My invention also contemplates the provision of a simple and efficient mechanical device which will perform the above named calculations irrespective of the numerical value of the numbers used.

Various objects and advantageous features of my invention and the principles embodied therein may be seen in the following description and the preferred embodiment of my invention may be seen in the accompanying drawings wherein similar characters of reference designate corresponding parts and wherein.

Figure 1:
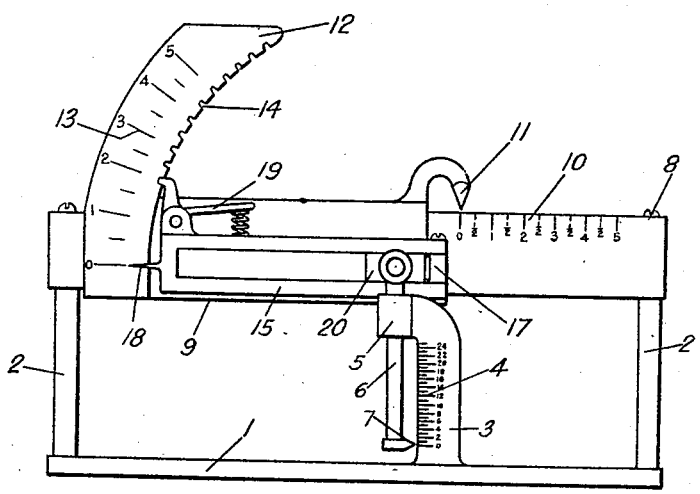
Figure 1 is a view showing one embodiment of my invention, the parts of the device being in such position as to indicate zero.
Figure 2:
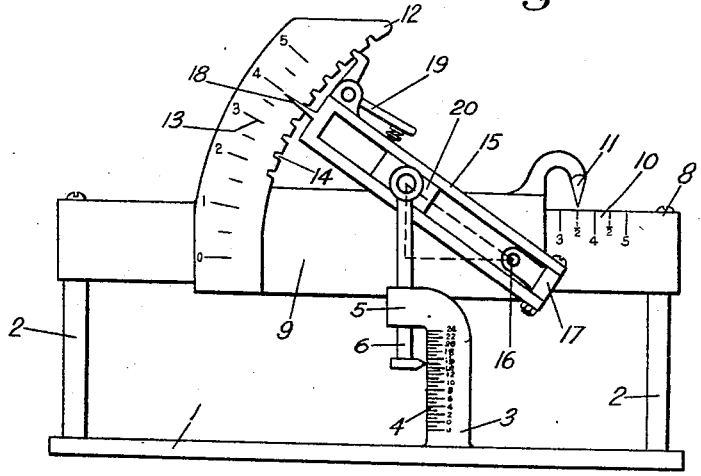
Figure 2 is a view similar to Figure 1 showing the parts of the device in such position as to multiply one number by another or to divide the product of these numbers by one of such numbers.

Referring to the drawings, particularly Figures 1 and 2, I have shown one form of my invention as consisting of a base plate 1 having standards 2 and a bracket 3 extending upwardly therefrom. The bracket 3 is calibrated as at 4 and has a guide 5 at the upper end thereof through which a bar or rod 6 is adapted to slide. Such rod or bar is provided with a pointer 7 at its lower end for a purpose hereinafter apparent.

A horizontal bar 8 is rigidly mounted on the uppermost ends of the standards 2 and provides a guide bar for a member 9 that is slidably mounted thereon. The guide bar 8 is calibrated as at 10 for a portion of its length.

The member 9 has a pointer 11 forming an integral part thereof and disposed on one of its ends. This pointer is adapted to register with the calibrations 10 on the guide bar 8. Rigidly attached to or forming an integral part of the sliding member 9 and disposed at the end thereof which is opposite the end at which the pointer 11 is located is a quadrant 12 that is calibrated as at 13 from zero to any desired terminal number. Such quadrant is notched on its inner edge as at 14.

As shown best in Figure 2, a bifurcated member or bracket 15 is pivotally mounted as at 16 on the sliding member 9 by means of a member 17 that is disposed between the bifurcated ends thereof. One end of this bracket or member 15 carries a pointer 18 that is adapted to register with the calibration 13 on the quadrant hereinbefore described and a latch 19 is mounted on the same end of the member 15 as the pointer 18. This latch member is adapted to cooperate with the notches 14 in the quadrant to lock the member 15 in such position that the pointer 18 will register with the desired number of the calibration on the quadrant.

A block 20 is so mounted between the parallel sides of the bifurcated member 15 that it will slide freely along the length of such member and the upper end of the rod or bar 6 is pivotally connected to such block.

The operation of this device is based on the principle or axiom that the length of the sine of any angle is equal to the length of the perpendicular dropped from one end of a circular arc upon the radius of the other end when the ratio of this perpendicular to the radius is considered as a function of the angle subtended by the arc. Also, to those familiar with the principles of triangles, it will be understood that the length of the sine for any given angle is directly proportional to the base line of the triangle and, therefore, will vary in length in direct proportion to the variation in the length of the base line. Further, the length of the sine for varying angles will vary in direct proportion to the variation in the length of the hypotenuse of the triangle since it is a well-known principle that the sine of any angle is equal to the length of the side opposite the angle divided by the length of the hypotenuse.

Figure 3:
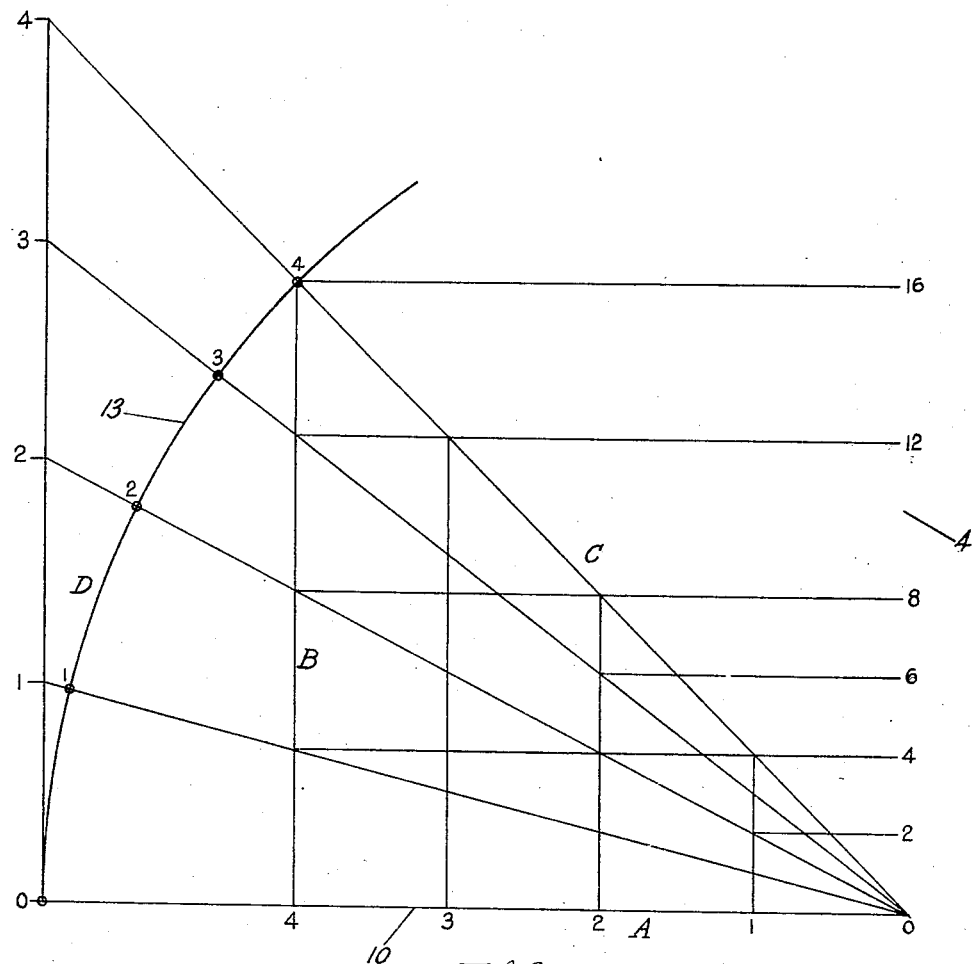
Figure 3 is a diagrammatic view showing the principle embodied in my invention.
Figure 4:
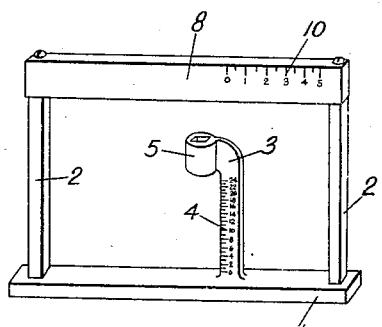
Figure 4 is a perspective view showing the supporting part of my device.
Figure 5:
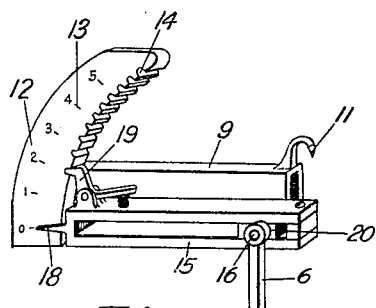
Figure 5 is a perspective view showing the remaining parts of my device.

In the operation of my device, I wish it understood that the calibrations 4, 10 and 13 are arbitrary. As shown in Figure 3 the calibrations 10 and 13 result from the equal division of the base line A and the line B which is perpendicular thereto of an isosceles right triangle ABC. The calibration 13 is transferred to a circular arc D which, in the other figures of the drawings, takes the form of the quadrant 12 by drawing a series of hypotenuses from a common point on the base line A of the triangle through a series of equally spaced points on the perpendicular side B of the triangle to the circular arc D that has the same center as the juncture of the hypotenuses C and the base line A.

The calibration 4 is such that the spacing between the numerals thereof will be directly proportional to the amount of variance in the length of the base line A and the amount of movement of the hypotenuse C of the triangle to vary the size of the angle AC. Calibration 4 is of such nature that, when the perpendicular side B is moved closer to the angle AC, thereby varying the base line, the length of the perpendicular B will vary in direct proportion to the variance in the length of the base line A. The length of the perpendicular side B will also vary in direct proportion to the variance in the length of the hypotenuse C when the angle AC is made larger or smaller by moving the hypotenuse.

In the mechanism hereinbefore described, the calibration 10 represents the base line of a right angle triangle, the calibration 13 represents the length of the perpendicular of the triangle and the calibration 4 represents the proportionate variation in the length of the perpendicular when the base line is varied or the hypotenuse is moved to vary the size of the angle subtended by the quadrant 12. The member 15 represents the hypotenuse of a triangle in the above mechanism.

The various calibrations 4, 10 and 13 are such that, when the member 9 of the mechanism is so moved as to locate the pointer 11 at a given number on the calibration 10 and the member 15 is so moved as to locate the pointer 18 at a given number on the calibration 13, the pointer 7 will be consequently moved to register with a number on the calibration 4 that is the product of the two numbers that have previously been selected on the calibrations 10 and 13.

In the event that the device is employed for division, the numeral on the calibration 13 would represent the divisor, the numeral on the calibration 4 would represent the dividend and the numeral on the calibration 10 would represent the quotient although it will be understood that either of the numbers on the calibrations 10 and 13 could represent the divisor and the number on the remaining calibration would then represent the quotient.

To use my device to obtain the product of two numbers, the latch 19 is first released from the notch 14 in which it is disposed and the pointer 18 is so moved as to register with one of the numbers to be multiplied that is disposed on the calibration 13 on the quadrant. Then, the sliding member 9 is moved along the guide bar 8 until the pointer 11 registers with the other number to be multiplied which forms a part of the calibration 10 on such guide bar. Since the length of the sine of any angle varies in direct proportion to the variation in the length of the base line or the length of the hypotenuse, the rod or bar 6 will be moved upwardly by the movement of the member 15 which forms the hypotenuse and the movement of the member 9 which forms the base line to such distance as to indicate on the calibration 4 the product of one of the numbers multiplied by the other. As hereinbefore stated, the graduations or calibrations 4 are so arranged proportionately to the other calibrations that this may be accomplished. A direct reversal of procedure may be followed in moving the parts of the device, that is, the sliding member 9 may be moved prior to the movement of the member 15.

In the use of my device in division, the latch 19 may be first released and the pointer 18 moved into registry with the divisor on the calibration 13. Then, the sliding member 9 may be moved until the pointer 7 on the rod or bar 6 is in registry with the dividend on calibration 4. With the parts in this position the pointer 11 on the sliding member 9 will register with the quotient or the result to be achieved on the calibration 10.

Figure 6:
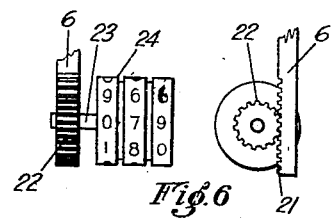
Figure 6 shows a plurality of views of a mechanism which may be used when it is desired to make permanent indications or records of the mathematical result achieved.

In Figure 6 of the drawings, I have shown a mechanism which is adapted to operate in conjunction with the various parts of my device hereinbefore described in the event that it is desired to make a permanent record of the results obtained in multiplying, adding, subtracting or dividing two numbers. In this figure the sliding rod or bar 6 is equipped with rack teeth 21 which mesh with a pinion 22. The pinion 22 is mounted on a shaft 23 which also carries a series of wheels 24 having numbers disposed about their outer circular surface. In this construction, the highest value or number on the wheels 24 would be the product of the highest numbers on the calibrations 4, 10 and 13.

When such structure is used in division calculating, the wheels 24 would necessarily be actuated by the movement of the sliding member 9 instead of by movement of the rod or bar 7 and the largest number on the type wheels would be the quotient of the smallest number on the calibration 13 when such number is divided into the highest number on the calibration 4.

While I have shown and described my invention as being particularly adapted to mathematical calculations involving multiplication or division, it will be apparent that my device might be adapted to other uses with equal success. For instance, referring to the accompanying drawings and the preceding description, it will be apparent that the calibration 4 might be such as to indicate the amount of change in the length of the side opposite the angle of the triangle that is formed by the base and the hypotenuse of the triangle, for instance, the angle AC shown in Figure 3. This is due to the fact that the calibration 4 is arbitrary and may merely be used to indicate the length of such side while, the calibrations 10 and 13 also being arbitrary may be used as indications of the length of the base line and the movement of the hypotenuse in varying the angle.

Further, referring to the drawings and the preceding description, it will be apparent that I have provided a simple and efficient device whereby computations involving multiplication and division may be accomplished mechanically.

Having thus described my invention, what I claim is:

1. A computing device operating on the principles of a triangle comprising a means for forming a triangle, means for varying the length of the base line of said triangle by moving the point of intersection between the side forming the hypotenuse of the triangle and the base line, means for holding constant the angle at the point of intersection while the base line is varied, and means for indicating the change in length of the side opposite one angle resulting from the variation in the length of the base line.

2. A device for multiplying or dividing comprising a plurality of elements disposed to form a triangle, said elements being adjustable for varying the length of the base line by moving the point of intersection between the side forming the hypotenuse of the triangle and the base line along such base line, means for indicating the length of the base line, means for varying the angle formed by the base line and hypotenuse, means for indicating the change in the length of the side opposite the angle, and means for indicating the product of the lengths of the adjusted base line and side.

3. A device for multiplying or dividing comprising a plurality of elements so disposed as to produce a triangle, said elements being adjustable to vary the length of the base line by moving the point of intersection between the side forming the hypotenuse and the base line or vary the size of the angle, a pointer and calibration to indicate the length of the base line, a pointer and calibration to indicate the proportionate length of the sine of the angle, and a pointer and calibration whose position is determined by the relative position of said first two pointers and calibrations, said last named calibration being so proportioned with relation to the other two calibrations that the position of one of the pointers on its calibration will indicate the quotient of one of the calibration numerals indicated divided by the calibration numeral indicated by the other pointer.

4. A device for multiplying or dividing comprising a plurality of elements so disposed as to produce a triangle, said elements being adjustable to vary the length of the base line by moving the point of intersection between the side forming the hypotenuse and the base line along such base line or vary the degree of the angle formed by the base line and the hypotenuse, a pointer and calibration to indicate the length of the base line, a pointer and calibration to indicate the proportionate length of the sine of the angle, and a pointer and calibration whose position is determined by the relative position of said first two pointers and calibrations, said last named calibration being so proportioned with relation with the other two calibrations that the position of the last named pointer on its calibration will indicate the product of the numerals indicated by the first two pointers.

5. A device for multiplying or dividing comprising a plurality of elements so disposed as to produce a triangle, said elements being adjustable to vary the base length of said triangle by moving the point of intersection between the side forming the hypotenuse and the base line along such base line or to vary the angle of such triangle, a series of calibrations for indicating the adjusted length of the base, a series of calibrations for indicating the proportionate length of the sine of the angle, and a third series of calibrations having a definite relation to the movement of the hypotenuse of the triangle and so proportioned with relation to the other two series of calibrations as to indicate the product of the numerals selected on such other two calibrations.

6. A mechanism for multiplying one number by another or dividing one number by another comprising, in combination, a calibration laid out on a part of the mechanism that forms the base line of a triangle, a calibration laid out on another part of the mechanism consisting of equal divisions on a line perpendicular to the base line, a bar pivoted at one point on the base line, said bar being adjustable to intersect the perpendicular line, means for moving the pivot of said bar along the base line and means slidably connected with said bar for indicating the length of the perpendicular line.

7. A computing device comprising a base, standards extending upwardly from said base, a bracket mounted on said base, a member adapted to slide in said bracket, a pointer on the lower end of said member, a horizontal bar mounted on said standard, and a member slidably mounted thereon, said member embodying a pivoted arm and a quadrant with which one end of said arm is adapted to register.

8. A computing device comprising a base, standards extending upwardly from said base, a bracket mounted on said base, a member adapted to slide in said bracket, a pointer on the lower end of said member, a horizontal bar mounted on said standard, and a member slidably mounted thereon, said member embodying a pivoted arm and a quadrant with which one end of said arm is adapted to register, a block carried by and slidable with relation to said pivoted arm, one end of the member which is adapted to operate in the bracket mounted on the base being pivoted to said block.

In testimony whereof I hereby affix my signature.

PERRY OKEY.